US008162001B2

(12) United States Patent
Yang

(10) Patent No.: US 8,162,001 B2
(45) Date of Patent: Apr. 24, 2012

(54) SHOWER FAUCET HAVING A SECOND ROTATING ELEMENT FOR PRE-SETTING WATER TEMPERATURE

(76) Inventor: Ue-Ming Yang, Moraga, CA (US)

( * ) Notice: Subject to any disclaimer, the term of this patent is extended or adjusted under 35 U.S.C. 154(b) by 1035 days.

(21) Appl. No.: 12/079,908

(22) Filed: Mar. 31, 2008

(65) Prior Publication Data

US 2009/0242055 A1    Oct. 1, 2009

(51) Int. Cl.
  *F16K 37/00*    (2006.01)
(52) U.S. Cl. ................... 137/556.6; 116/277; 116/309
(58) Field of Classification Search .............. 137/359, 137/553, 556, 556.3, 606, 607, 625.41, 556.6; 116/277, 306, 309
  See application file for complete search history.

(56) References Cited

U.S. PATENT DOCUMENTS

| 841,817 | A | * | 1/1907 | Ricketts | 236/12.2 |
| 1,427,606 | A | * | 8/1922 | Leahy | 137/625.12 |
| 3,712,587 | A | * | 1/1973 | Specht | 251/285 |
| 5,865,473 | A | * | 2/1999 | Semchuck et al. | 285/55 |
| 6,052,929 | A | * | 4/2000 | Canadas | 40/331 |
| 7,077,150 | B2 | * | 7/2006 | McNerney | 137/15.01 |

* cited by examiner

*Primary Examiner* — Kevin Lee
*Assistant Examiner* — R. K. Arundale

(57) ABSTRACT

A mixing valve has a first rotating element connected to a valve stem for use as a valve handle, and a second rotating element for pre-setting the valve handle at a desired water temperature position. After pre-setting, user can turn the valve handle directly to the desired temperature position without trial and error.

6 Claims, 7 Drawing Sheets

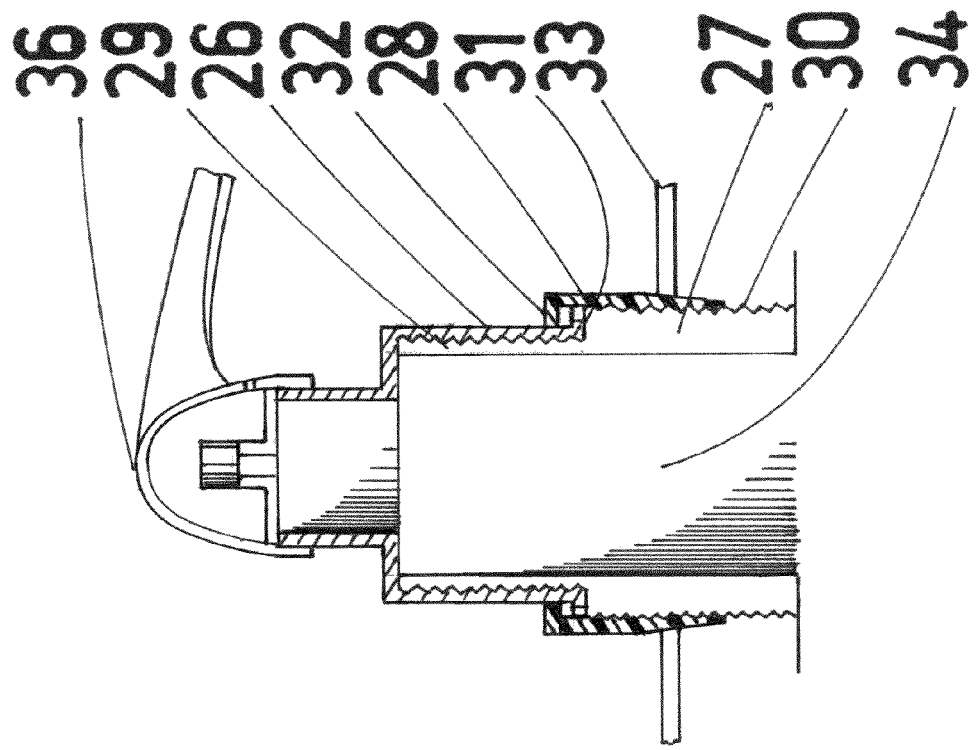
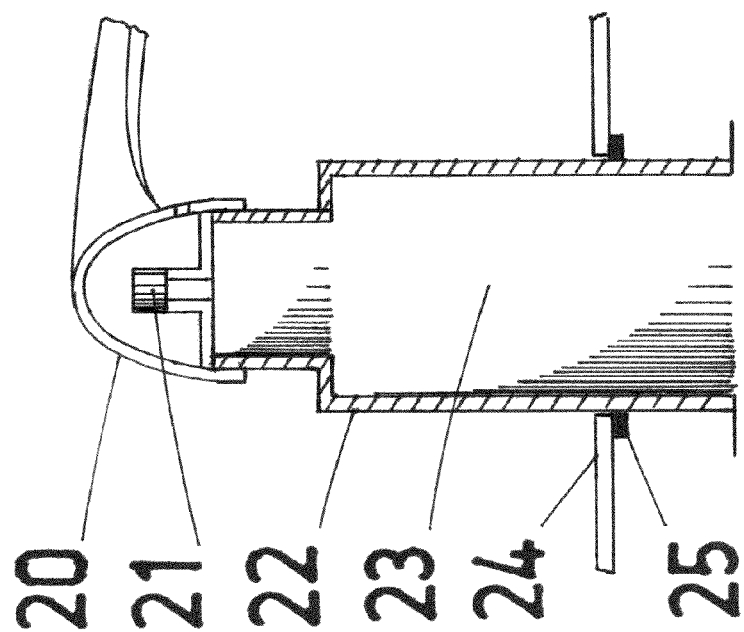
FIG. 4B
FIG. 3B PRIOR ART

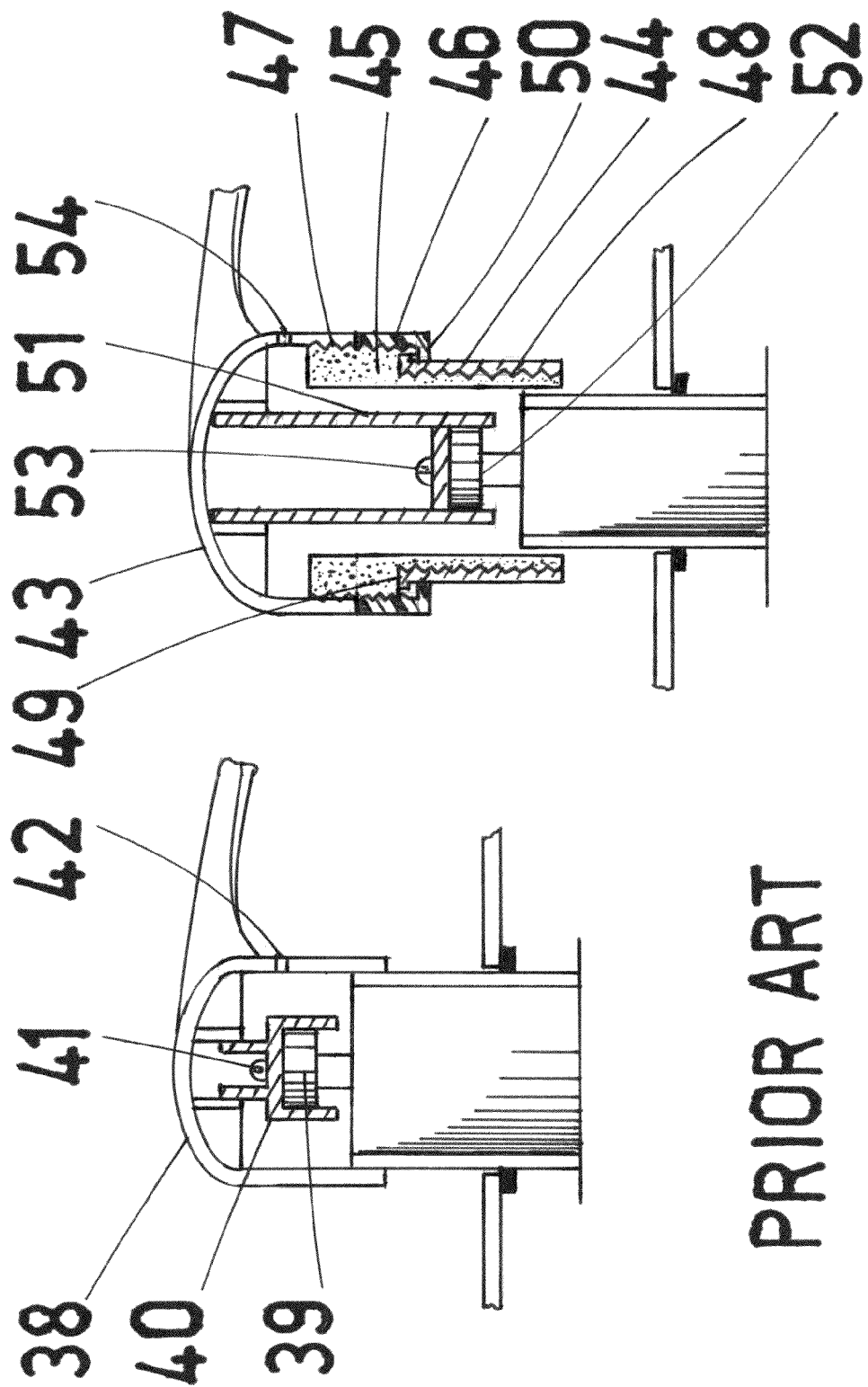

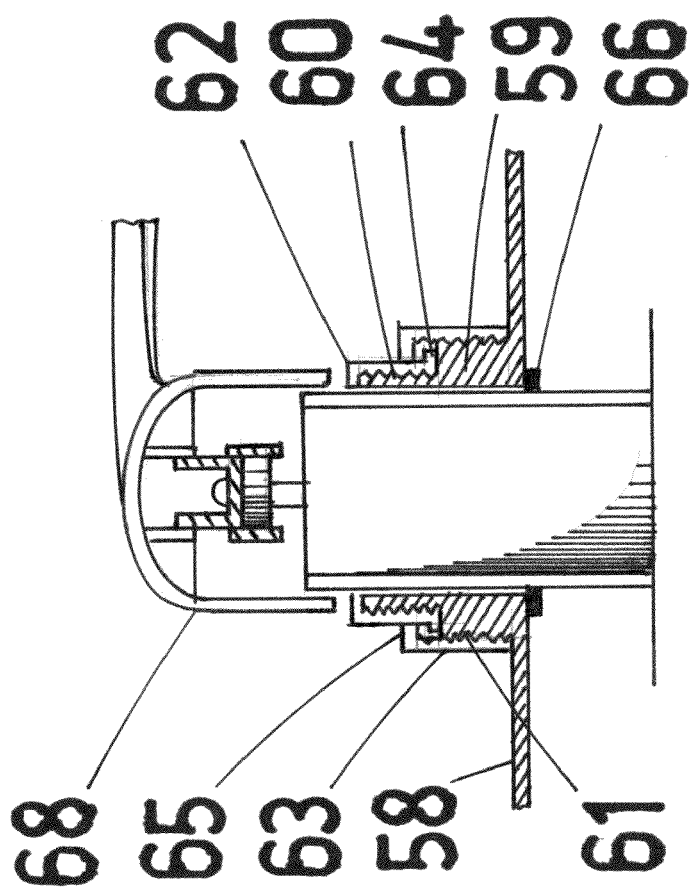
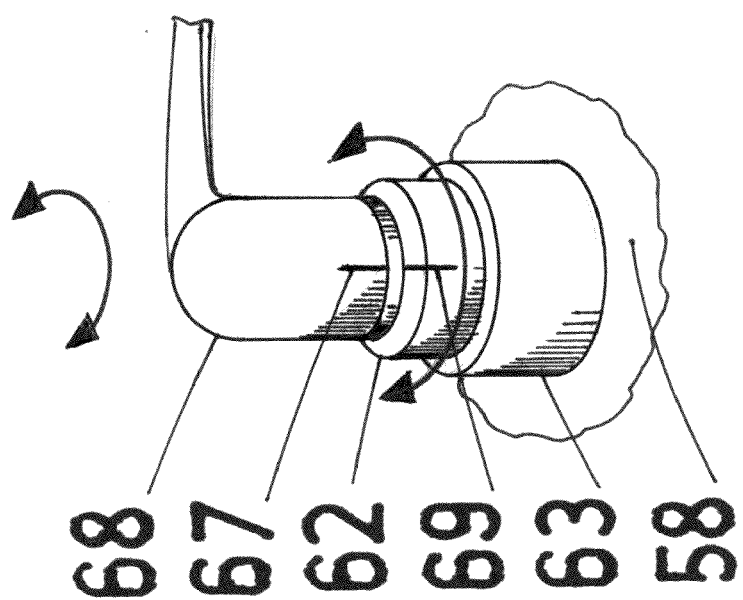
FIG. 7B
FIG. 7A

SHOWER FAUCET HAVING A SECOND ROTATING ELEMENT FOR PRE-SETTING WATER TEMPERATURE

BACKGROUND OF THE INVENTION

This invention relates to a hot-cold water mixing valve, in which, the outlet water temperature is adjusted by rotating the valve handle connected to the valve stem.

Each time a person goes to take a shower or bath, he must go through a routine of repeatedly adjusting handle position and feeling water temperature until a desired temperature being obtained. This trial-and-error routine is time consuming and wastes water. Also during a shower, the user may need to turn off the valve for soaping, and turn on the valve again after soaping. Going through the trial-and-error routine during a shower is particularly inconvenient.

One prior approach to the above problems is to provide a mixing valve with two handles. One handle is to turn the valve on and off, so as to control water flow rate. Another handle is to control water temperature only. The drawbacks of this approach are: (1). Such a valve consists of more complicated components and becomes more expensive. (2). In order to quickly flush out residual cold water in the hot water pipe, user may prefer to set the valve handle at maximum hot temperature position prior to taking a shower. As a result, the user still needs to go through the trial-and-error routine to adjust the valve handle position to obtain the desired temperature position.

Another prior approach to the above problems is to provide position indicating marks. It is a common knowledge that at least two individual marks are required to determine the position of the valve handle (i.e., the degree of rotation of handle), one on the handle, and one on a stationary element of the valve. The relative movement between the two marks indicates the degree of rotation of handle. Based on this common knowledge, a group of marks can be provided on a stationary element of the valve, and another group of marks can be provided on the handle. When user rotates the handle to the desired temperature position, he needs to memorize the particular mark on the stationary element that is in line with the particular mark on the handle. The next time when the user needs to turn the handle to the desired temperature position, he can rely on his memory to recall and align the two particular marks. This type of prior approach can be found in U.S. Pat. Nos. 6,052,929 and 6,343,619. The obvious drawback of this approach is that user must memorize the marks at all time. Another obvious drawback is that multiple marks are difficult to read.

Another prior approach to the above problems is to provide position indicating marks that can pre-set the handle to the desired temperature position. This approach provides two position indicating marks, one fixed mark and one moveable mark. The first step to pre-set handle to the desired temperature position is to rotate handle to the desired temperature position by trial-and-error. The second step is to move the moveable mark to meet the fixed mark. After the handle is pre-set, user can rotate handle directly to the desired temperature position by aligning the fixed and moveable marks. This type of prior approach can be found in U.S. Pat. Nos. 5,170,816, and 6,283,447.

In U.S. Pat. No. 5,170,816, Schneider proposes a fixed mark on a stationary element of the valve, and multiple moveable marks on multiple small moving parts that side in a slot on the valve handle. There are several drawbacks in Schneider's approach. First, the moveable marks on small moving parts (i.e., sliding parts) are difficult to maneuver. Second, the slot and multiple moveable marks are difficult to be cleaned. Mildew can build up in the slot and in the hidden areas behind the moveable marks. Third, it is impossible to clean the hidden areas behind the moveable marks without moving the moveable marks. As a result, the moveable marks need to be pre-set each time after cleaning. Fourth, the moveable marks can be accidentally moved. Fifth, the overall appearance of the faucet becomes less attractive.

In U.S. Pat. No. 6,283,447, Fleet proposes a fixed mark on valve handle, and a moveable mark on a small part connected to a rotating ring. There are several drawbacks in Fleet's approach: First, user needs to take two simultaneous actions (i.e., to pull and rotate) in order to move the moveable mark. Second, the moveable mark on a small moving part is difficult to maneuver. Third, the moveable mark uses a small resilient hinge to stabilize its position. As a result, it can fail due to fatigue of the resilient hinge, or due to large pulling force exercised by user. Fourth, the moveable mark is difficult to be cleaned. Mildew can build up in the hidden area behind the moveable mark. Fifth, it is impossible to clean the hidden area behind the moveable mark without moving the moveable mark. As a result, the moveable mark needs to be pre-set each time after cleaning.

Therefore, there is still a need for a new approach to solve the above problems and overcome all the drawbacks of prior approaches.

The new approach of present invention is to add a second rotating element to a conventional mixing valve. The conventional mixing valve typically has only a single rotating element (i.e., valve handle) connected to a valve stem. This can be done by constructing a new rotating element, or converting an existing stationary element to a rotating element. In either case, the second rotating element becomes an integral structure of the mixing valve assembly. The second rotating element of present invention rotates about the axis of the valve stem. A fixed mark, referred to as the second mark hereinafter, is provided on the outer surface of the second rotating element. Another fixed mark, referred to as the first mark hereinafter, can be provided either on the outer surface of a stationary element, or on the outer surface of valve handle (i.e., first rotating element).

In the case that the first mark is provided on the valve handle, the valve handle and the second rotating elements must rotate independently so that there is a relative movement between first and second marks. The valve handle can be pre-set to the desired temperature position as follows: First, rotate the valve handle to the desired temperature position by trial-and-error. Second, rotate the second rotating element to a stop position where second mark meets first mark. After the valve handle is pre-set, user can rotate the valve handle directly to the desired temperature position by aligning first mark to second mark.

In the case that first mark is provided on a stationary element, valve handle and the second rotating elements must rotate concurrently so that there is no relative movement between valve handle and the second rotating element, but there is a relative movement between first and second marks. The valve handle can be pre-set to the desired temperature position as follows: First, rotate valve handle to the desired temperature position by trial-and-error. Second, rotate the second rotating element to a stop position where second mark meets first mark. After the valve handle being pre-set, user can rotate the handle directly to the desired temperature position by aligning second mark to first mark.

One distinctive aspect of present invention is to provide a second rotating element, which is an integral part of the valve assembly. As a result, the overall appearance of the valve assembly remains unchanged. In other words, there is no adverse impact to the overall appearance of the valve assembly due to the addition of the second rotating element.

Another distinctive aspect of present invention is to eliminate the need for a small moving part serving as a moveable mark. As a result, the present invention overcomes all the drawbacks caused by using the small moving part in prior art.

Another distinctive aspect of present invention is to eliminate the use of multiple moveable marks. The reasons are as follows: (1). Multiple moveable marks can be confusing. (2). Any second user, other than the person who pre-sets the valve handle, can be benefited by the pre-set marks. This is because the second user can avoid the possibility of being scaled, and adjust the valve handle to the desired temperature position in a smaller range. (3). In the case of commercial use such as in hotel, the present invention allows house maid to pre-set the handle position to a comfortable temperature.

Another distinctive aspect of present invention is that the second rotating element is provided with limit stops for restricting maximum forward and rearward axial movements without using conventional set screws. Such limit stops prevent the possibility of the second rotating element being accidentally detached from the valve assembly. This also enhances the overall appearance of the valve assembly.

SUMMARY OF THE INVENTION

One object of present invention is to provide an economical solution to allow the valve handle to be pre-set to the desired water temperature position.

Another object of present invention is to provide the above pre-set feature without an adverse effect to the overall appearance, operability, or cleaning ability of the valve.

Another object of present invention is to provide a reliable means for securing the second rotating element so that second rotating element can not be accidentally detached from the valve assembly.

Another object of present invention is to provide a reliable means for securing the rotational position of the second rotating element so that the rotational position of the second rotating element cannot be accidentally changed.

Another object of present invention is to strategically locate the first and second marks so that user can easily see both first and second marks when they meet each other.

BRIEF DESCRIPTION OF THE DRAWINGS

FIG. 3B is a cross sectional view of FIG. 3A.

FIG. 4B is a cross sectional view of FIG. 4A.

FIG. 5B is a cross sectional view of FIG. 5A.

FIG. 6B is a cross sectional view of FIG. 6A.

FIG. 7A is a perspective view of the fourth preferred embodiment of the mixing valve of present invention.

FIG. 7B is a cross sectional view of FIG. 7A.

DETAILED DESCRIPTION OF THE DRAWINGS

Figure 1A:
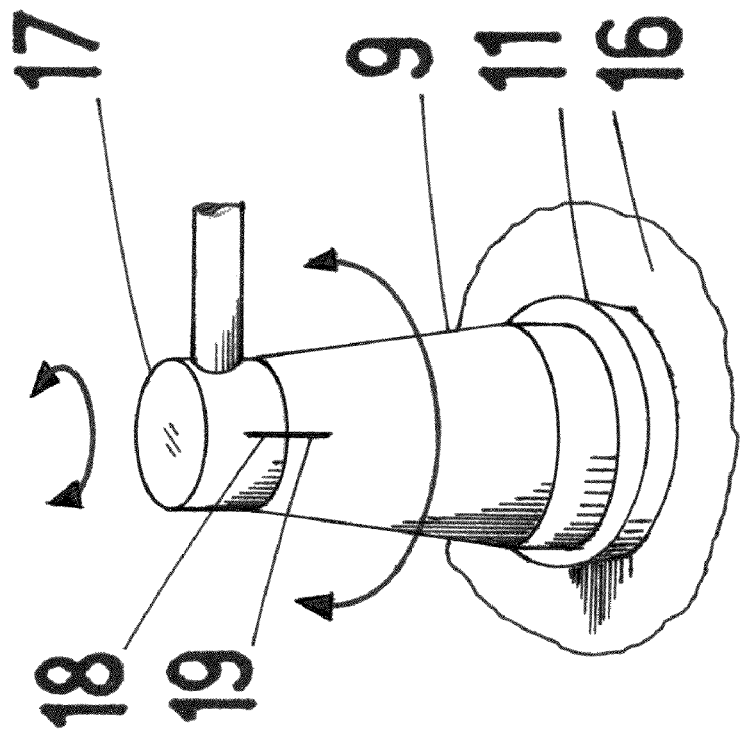
FIG. 1A is a perspective view of a conventional mixing valve of prior art.

The scope of present invention is to construct a new rotating element, or to convert an existing stationary element to a rotating element in a conventional mixing valve of prior art. Consequently, the mixing valve of present invention will be provided with a second rotating element, in addition to the valve handle (i.e., the first rotating element). For purpose of clear demonstration of the scope of present invention, some parts and details are provided in the drawings without proper scale, and some parts and details are intentionally omitted in the drawings if they are not related to the scope of present invention.

Figure 1B:
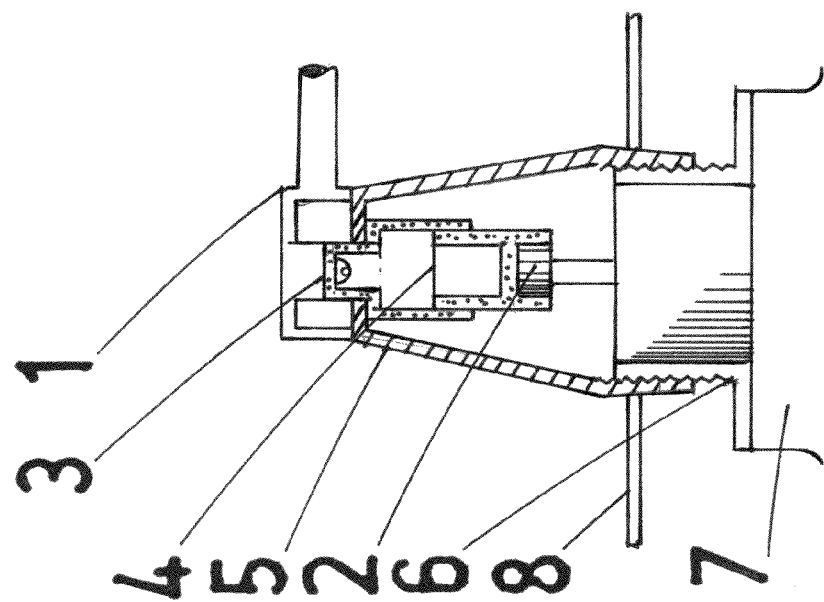
FIG. 1B is a cross sectional view of FIG. 1A.

FIG. 1A is a perspective view of a conventional mixing valve of prior art. FIG. 1B is a cross sectional view of FIG. 1A. In FIGS. 1A and 1B, the valve has a handle 1 connected to valve stem 2 through adapters 3 and 4. The stem housing 5 is threadedly engaged to a threaded bushing 6, which is anchored to the valve body 7 with screws (not shown). The stem housing 5 supports a screw-less escutcheon 8.

Figure 2A:
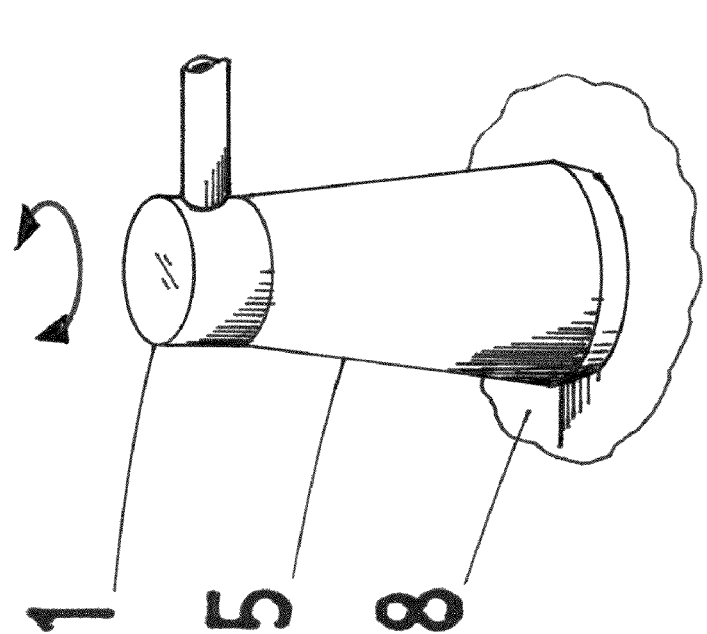
FIG. 2A is a perspective view of the first preferred embodiment of the mixing valve of present invention, which is converted from FIG. 1A.
Figure 2B:
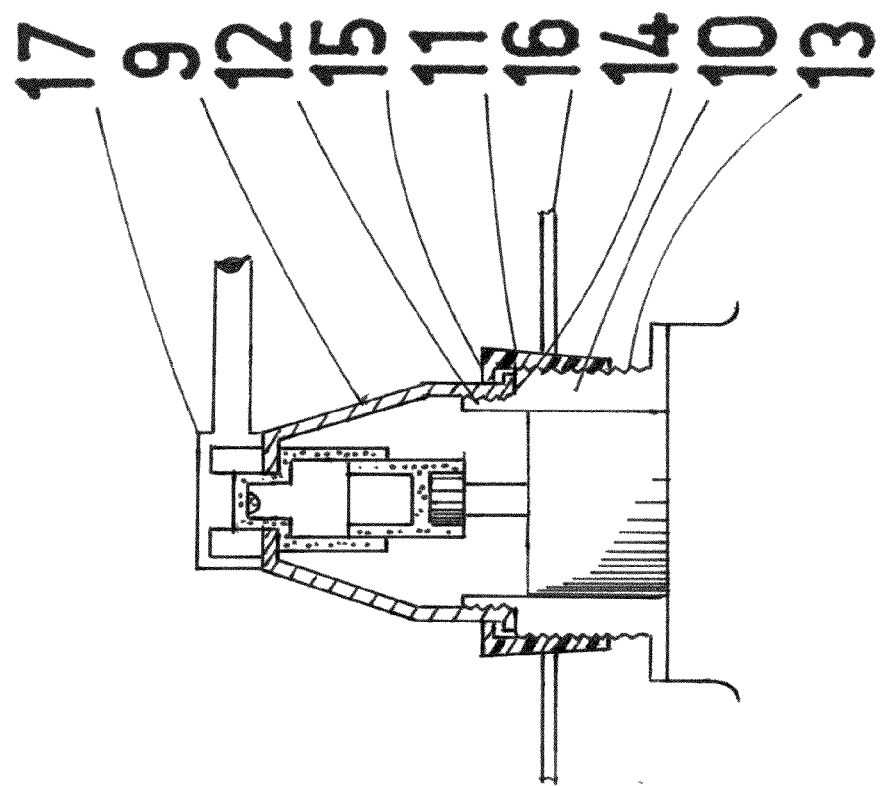
FIG. 2B is a cross sectional view of FIG. 2A.

FIGS. 2A and 2B show the first preferred embodiment of the mixing valve of present invention, which converts the stationary stem housing 5 in FIGS. 1A and 1B to a rotatable stem housing 9 in FIGS. 2A and 2B. Stem housing 9 becomes the so called "second rotating element" of the valve assembly of present invention, which envelopes the valve assembly, forms an water-tight enclosure of the valve assembly, and maintains a water-tight seal while being rotated. This conversion requires a bushing 10 and collar 11 to be added to the existing valve assembly, which form a rotating assembly. Bushing 10 is anchored to valve body with screws (not shown), that is similar to the method of anchoring bushing 6 to the valve body 7 in the mixing valve of prior art in FIG. 1B. Bushing 10 is divided into an upper section 12 and a lower section 13. The outside diameter of upper section 12 is smaller than that of lower section 13 so that there is a step created at the integral joint of upper and lower sections 12 and 13. The stem housing 9 is threadedly engaged to the upper section 12 of bushing 10 by right hand threads, and collar 11 is threadedly engaged to the lower section 13 of bushing 10 by left hand threads. The lower end of stem housing 9 is projected radially outward with an ear 14, and the upper end of collar 11 is projected radially inward with a shoulder 15. The outside diameter of ear 14 is smaller than that of the lower section 13 of bushing 10. The outside diameter of the cylindrical section of stem housing 9 is decimally smaller than the inside diameter of shoulder 15.

FIG. 2B shows stem housing 9 is at the lowest elevation, or at the maximum forward axial movement, where stem housing 9 is stopped by the step between the upper and lower sections 12 and 13 of bushing 10. The inclined outer surface of collar 11 is contacted by escutcheon 16. Therefore, screws are not needed for securing escutcheon 16 to wall. Shoulder 15 forms a rearward stop that restricts the maximum rearward axial movement of stem housing 9. Consequently, stem housing 9 is free to rotate within the clearance between shoulder 15 and ear 14, and shoulder 15 prevents stem housing 9 from being accidentally departed from the valve assembly. Stem housing 9 can only be departed from the valve assembly after disengaging collar 11 from bushing 10. Since handle 17 is typically assembled to stem housing 9 prior to engaging stem housing 9 to bushing 10, collar 11 must be maneuvered through handle 17 prior to engaging collar 11 to bushing 10.

FIG. 2A shows a first mark 18 provided on the outer surface of valve handle 17, and a second mark 19 is provided on the outer surface of stem housing 9. Both marks 18 and 19 are shown as straight lines, which are strategically located so that they provide clear visibility as they meet each other.

Due to large thread engagement areas provided between stem housing 9 and bushing 10, it becomes apparent that: (1). Stem housing 9 is unlikely to be accidentally rotated. (2). Stem housing 9 and handle 17 rotates independently, not concurrently. However, if there is a need to increase rotational resistance during rotating stem housing 9, a spring coil (not shown) can be inserted into the clearance space between ear 14 and shoulder 15 prior to engaging collar 11 to bushing 10. It should be noted that continuously rotating stem housing 9 counter clockwise against shoulder 15 will tighten rather than loosen collar 11. This is because stem housing 9 has right hand threads, and collar 11 has left hand threads.

It should be noted that outer surfaces of stem housing 9 and collar 11 have a decorative finish. The axial movement of stem housing 9 during rotating stem housing 9 is not truly noticeable from the appearance of the valve assembly. There is no set screw required for the second rotating element. All these enhance the appearance of the new valve assembly of present invention.

Figure 3A:
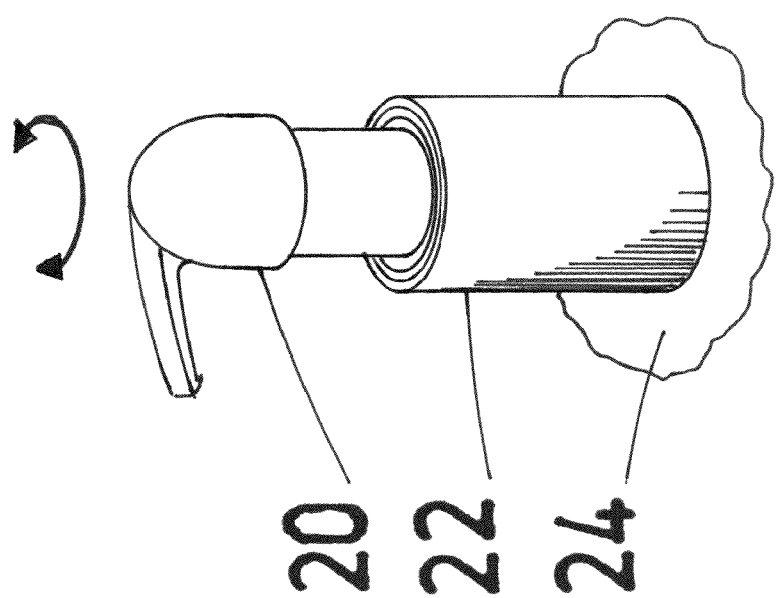
FIG. 3A is a perspective view of another conventional mixing valve of prior art.

FIG. 3A is a perspective view of another conventional mixing valve of prior art. FIG. 3B is a cross sectional view of FIG. 3A. In FIGS. 3A and 3B, the valve has a handle 20 connected to valve stem 21. The stem housing 22 is fit nicely onto valve body 23. Escutcheon 24 is fixedly attached to a wall (not shown) by a pair of screws (not shown). Gasket 25 is provided at the center opening of escutcheon 24 to prevent water intrusion.

Figure 4A:
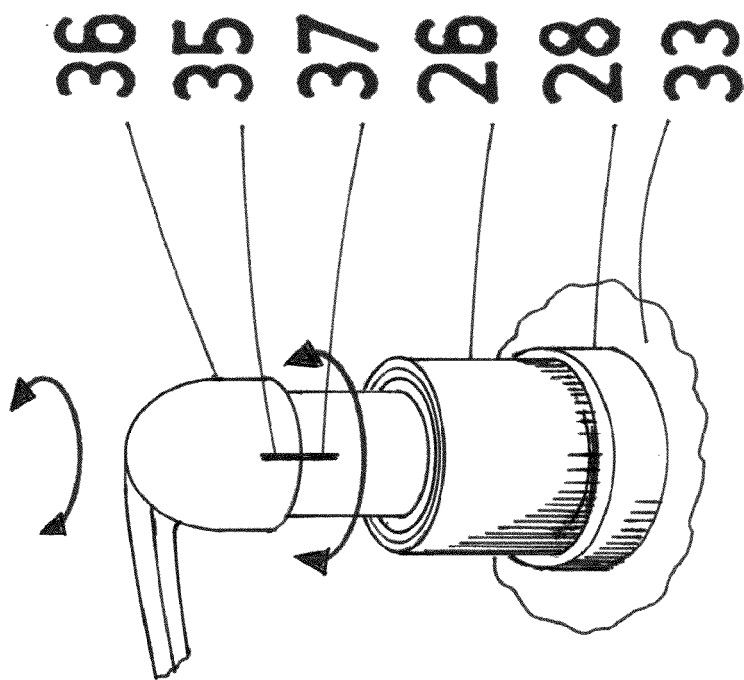
FIG. 4A is a perspective view of the second preferred embodiment of the mixing valve of present invention, which is converted from FIG. 3A.

FIG. 4A is a perspective view of the second preferred embodiment of the mixing valve of present invention. FIG. 4B is a cross sectional view of FIG. 4A. The second preferred embodiment of the mixing valve of present invention converts the stationary stem housing 22 in FIGS. 3A and 3B to a rotatable stem housing 26 in FIGS. 4A and 4B. Stem housing 26 becomes the so called "second rotating element" of the valve assembly of present invention, which envelopes the valve assembly, forms an water-tight enclosure of the valve assembly, and maintains a water-tight seal while being rotated. This conversion requires a bushing 27 and collar 28 to be added to the existing valve assembly, which form a rotating assembly similar to that of the first preferred embodiments of present invention. Bushing 27 is divided into an upper section 29 and a lower section 30. The outside diameter of upper section 29 is smaller than that of lower section 30 so that there is a step created at the integral joint of upper and lower sections 29 and 30. The stem housing 26 is threadedly engaged to the upper section 29 of bushing 27 by right hand threads, and collar 28 is threadedly engaged to the lower section 30 of bushing 27 by left hand threads. The lower end of stem housing 26 is projected radially outward with an ear 31, and the upper end of collar 28 is projected radially inward with a shoulder 32. The outside diameter of ear 31 is smaller than that of the lower section 30 of bushing 27. The outside diameter of the lower cylindrical section of stem housing 26 is decimally smaller than the inside diameter of shoulder 32. It should be noted that bushing 27 is attached to valve body 34 with a means (not shown) that prevents bushing 27 from rotating around valve body 34.

FIG. 4B shows stem housing 26 is at the lowest elevation, or at the maximum forward axial movement, where stem housing 26 is stopped by the step between the upper and lower sections 29 and 30 of bushing 27. The inclined outer surface of collar 28 is contacted by escutcheon 33. Therefore, screws are not needed for securing escutcheon 16 to wall. Due to the close contact between the inclined surfaces of collar 28 and escutcheon 33, no gasket is needed at the center opening of escutcheon 33 for preventing water intrusion. Shoulder 32 forms a rearward stop that restricts the maximum rearward axial movement of stem housing 26. Consequently, stem housing 26 is free to rotate within the clearance between shoulder 32 and ear 31, and shoulder 32 prevents stem housing 26 from being accidentally departed from the valve assembly. Stem housing 26 can only be departed from the valve assembly after disengaging collar 28 from bushing 27.

FIG. 4A shows a first mark 35 is provided on the outer surface of valve handle 36, and a second mark 37 is provided on the outer surface of stem housing 26. Both marks 35 and 37 are shown as straight lines, which are strategically located so that they provide clear visibility as they meet each other.

It should be noted that the above second preferred embodiments of present invention has not only provided the second rotating element, but also made two significant improvements over the conventional mixing valve of prior art. First, the escutcheon becomes a screw-less escutcheon. Second, no gasket is needed at the center opening of escutcheon for preventing water intrusion.

Figure 5A:
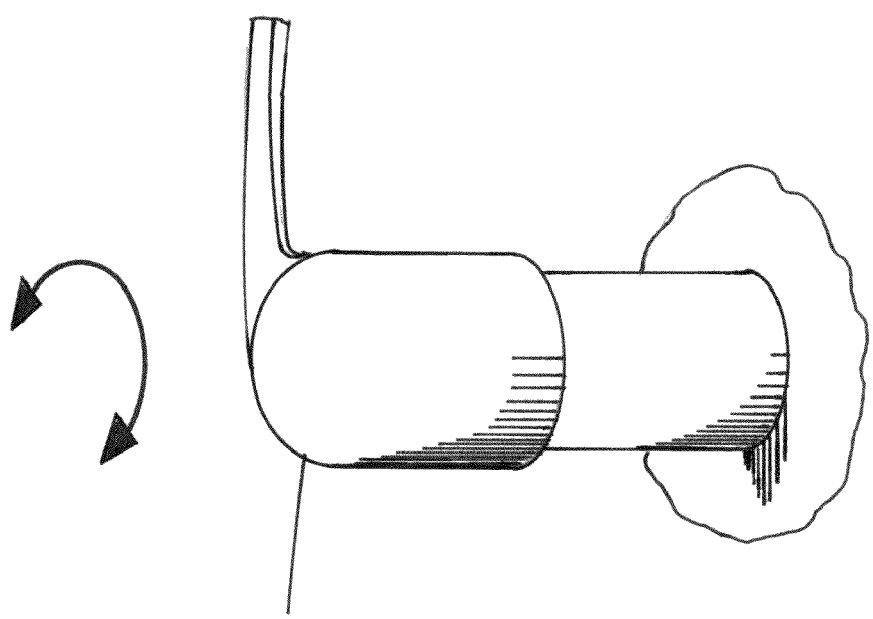
FIG. 5A is a perspective view of another conventional mixing valve of prior art.

FIG. 5A is a perspective view of another conventional mixing valve of prior art. FIG. 5B is a cross sectional view of FIG. 5A. FIGS. 5A and 5B show valve handle 38 is fixedly attached to valve stem 39 through adaptor 40. Adaptor 40 is fixedly attached to valve stem by screw 41, and handle 38 is fixedly attached to adaptor 40 by a set screw (not shown) passing through a set screw hole 42.

Figure 6A:
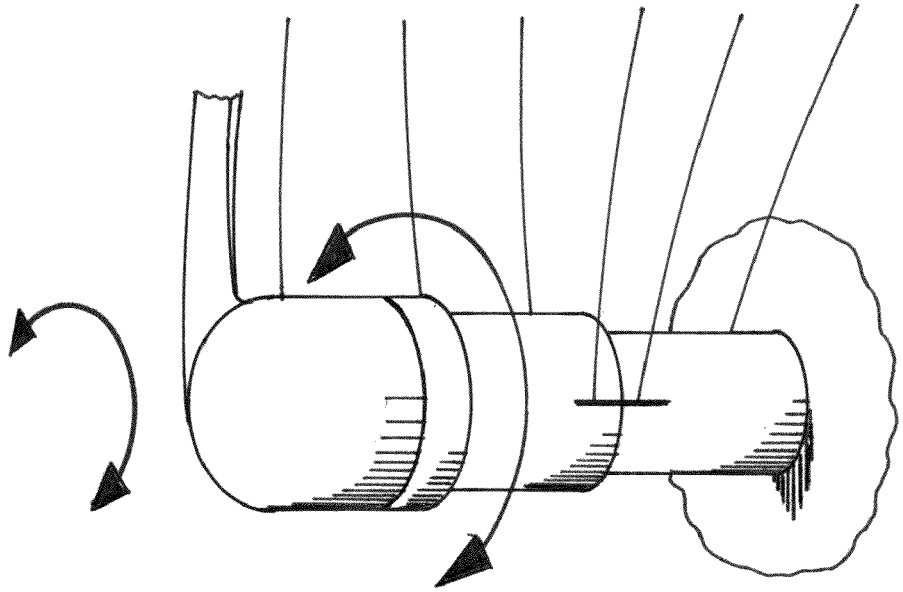
FIG. 6A is a perspective view of the third preferred embodiment of the mixing valve of present invention, which is converted from FIG. 5A.

FIG. 6A is a perspective view of the third preferred embodiment of the mixing valve of present invention. FIG. 6B is a cross sectional view of FIG. 6A. The third preferred embodiment of the mixing valve of present invention requires only structural modification on the valve handle of conventional mixing valve, which converts the handle 38 in FIGS. 5A and 5B to a handle body 43 and a rotatable handle housing 44 in FIGS. 6A and 6B. The handle body 43 becomes the so called "first rotating element". The rotatable handle housing 44, which is connected to the handle body 43 and rotatable about the axis of the valve stem, becomes the so called "second rotating element" of the mixing valve assembly of present invention. This conversion requires an addition of bushing 45 and collar 46 to form a rotating assembly. Bushing 45 is divided into an upper section 47 and a lower section 48, which is similar to the bushing discussed in previous preferred embodiments of present invention. The outside diameter of upper section 47 is larger than that of lower section 48 so that there is a step created at the integral joint of upper and lower sections 47 and 48. Bushing 45 can be an independent part threadedly engaged to handle body 43, or an integral part of handle body 43. Handle housing 44 is threadedly engaged to the lower section 48 of bushing 45 by right hand threads, and collar 46 is threadedly engaged to the upper section 47 of bushing 45 by left hand threads. The upper end of handle housing 44 is projected radially outward with an ear 49, and the lower end of collar 46 is projected radially inward with a shoulder 50. Adaptor 51 is fixedly attached to valve stem 52 by a screw 53. Handle body 43 is fixedly attached to adaptor 51 by a set-screw (not shown) passing through a set screw hole 54.

FIG. 6B shows handle housing 44 is at the highest elevation, or at the maximum upward axial movement, where handle housing 44 is stopped by the step between the upper and lower sections 47 and 48 of bushing 45. Shoulder 50 forms a downward stop that restricts the maximum downward axial movement of handle housing 44. Consequently, handle housing 44 is free to rotate within the clearance between shoulder 50 and ear 49, and shoulder 50 prevents handle housing 44 from being accidentally departed from the valve assembly. Handle housing 44 can only be departed from the valve assembly aster disengaging collar 46 from bushing 45.

FIG. 6A shows a first mark 55 is provided on the outer surface of rotatable handle housing 44, and a second mark 56 is provided on the outer surface of stationary stem housing 57. Both marks 55 and 56 are shown as straight lines, which are strategically located so that they provide clear visibility as they meet each other.

FIG. 7A is a perspective view of the fourth preferred embodiment of the mixing valve of present invention. FIG. 7B is a cross sectional view of FIG. 7A. The fourth preferred embodiment of the mixing vale of present invention requires only a structural modification on the escutcheon. In FIGS. 7A and 7B, escutcheon 58 has an integrally constructed bushing 59 divided into upper and lower sections 60 and 61, which is similar to the bushing discussed in the previous preferred embodiments. A rotatable cylindrical housing 62 is threadedly engaged to upper section 60 of bushing 59, and a fixed cylindrical housing is threadedly engaged to lower section 61 of bushing 59. The rotatable cylindrical housing 62 becomes the so called "second rotating element" of the valve assembly of present invention that is rotatably connected to escutcheon 58, and maintains a water-tight seal while being rotated. The lower end of rotatable cylindrical housing 62 is projected radially outward with an ear 64, and the upper end of fixed cylindrical housing 63 is projected radially inward with a shoulder 65. Gasket 66 is provided at the center opening of escutcheon 58 for preventing water intrusion. Escutcheon 58 is attached to wall by a pair of screws (not shown).

FIG. 7A shows a first mark 67 is provided on the outer surface of valve handle 68, and a second mark 69 is provided on the outer surface of rotatable cylindrical housing 62 of escutcheon 58. Both marks 67 and 69 are shown as straight lines, which are strategically located so that they provide clear visibility as they meet each other.

The above description of the preferred embodiments of present invention shall be considered as a demonstration of the diversity of the present invention, rather than the limiting conditions of the present invention. To enhance the control of the rotational movement of the second rotating element, all the preferred embodiments of present invention can be further modified to incorporate a spring coil to provide additional resistance to the rotational and axial movements of the second rotating element. Such variation and modification shall be considered within the scope of present invention.

In summary, the scope of present invention is to construct a new second rotating element, or to convert an existing stationary element to a second rotating element in a conventional mixing valve, which is to be operated in conjunction with the valve handle (i.e., the first rotating element). Since parts and details of conventional mixing valves are varied from valve to valve, it is not possible to demonstrate the scope of present invention based on every conventional mixing valve available on today's market. Therefore, variations and modifications to the above preferred embodiments are allowable, and shall be considered within the scope of present invention.

What is claimed is:

1. A mixing valve assembly comprising a mixing valve including a valve body having: a first rotating element connected to a valve stem for turning on and off said mixing valve, and for adjusting outlet water temperature of said mixing valve; and a first mark on said first rotating element; and a second rotating element being an integral part of a water-tight enclosure of said mixing valve, maintaining a water-tight seal of said water-tight enclosure while being rotated, and forming said water-tight enclosure that envelopes said valve body of said mixing valve, covers a hole in a shower wall thereto said valve body penetrates, and prevents water leakage to a hidden area behind said shower wall; and a second mark on said second rotating element; wherein: a relative movement between said first and second marks occurs when said first rotating element is rotated; and said mixing valve is capable of presetting said outlet water temperature to a desired water temperature by, firstly, rotating said first rotating element to a stop position corresponding to said desired water temperature, and secondly, rotating said second rotating element to a stop position where said second mark meets said first mark; and said mixing valve is capable of retrieving said desired water temperature after said mixing valve being pre-set to said desired water temperature, in which, said first rotating element is rotated to a stop position where said first mark meets said second mark.

2. The mixing valve according to claim 1, in which, said mixing valve is provided with a locking means so that an escutcheon is securely attached to a wall without requiring screws.

3. A mixing valve assembly comprising a mixing valve including a valve body having: a first rotating element connected to a valve stem for turning on and off said mixing valve, and for adjusting outlet water temperature of said mixing valve; and a first mark on a stationary element of said mixing valve; and a second rotating element that is rotatably connected and threadedly engaged to said first rotating element, rotatable about the axis of said valve stem, and forming an integral part of a water-tight enclosure that envelopes said valve stem; and a second mark on said second rotating element; wherein: no relative movement between said first and second rotating elements occurs when said first rotating element is rotated, but, a relative movement between said first and second marks occurs when said first rotating element is rotated, a relative movement between said first and second marks occurs when said second rotating element is rotated, and a relative movement between said first and second rotating elements occurs when said second rotating element is rotated; and said mixing valve is capable of pre-setting said outlet water temperature to a desired water temperature by, firstly, rotating said first rotating element to a stop position corresponding to said desired water temperature, and secondly, rotating said second rotating element to a stop position where said second mark meets said first mark; and said mixing valve is capable of retrieving said desired water temperature after said mixing valve being pre-set to said desired water temperature, in which, said first rotating element is rotated to a stop position where said second mark meets said first mark.

4. A mixing valve assembly comprising a mixing valve including a valve body having: a first rotating element connected to a valve stem for turning on and off said mixing valve, and for adjusting outlet water temperature of said mixing valve; and a first mark on said first rotating element; and an escutcheon forming a water-tight enclosure for covering a hole in a wall where the valve body of said mixing valve penetrates through; and a second rotating element that is rotatably connected to said escutcheon in the axial direction of said valve stem of said mixing valve, and maintains a water-tight seal of said escutcheon while being rotated; and a second mark on said second rotating element; wherein: a relative movement between said first and second marks occurs when said first rotating element is rotated; and said mixing valve is capable of pre-setting said outlet water temperature to a desired water temperature by, firstly, rotating said first rotating element to a stop position corresponding to said desired water temperature, and secondly, rotating said second rotating element to a stop position where said second mark meets said first mark; and said mixing valve is capable of retrieving said desired water temperature after said mixing valve being pre-set to said desired water temperature, in which, said first rotating element is rotated to a stop position where said first mark meets said second mark.

5. The mixing valve according to claim 1, 3 or 4, in which, said second rotating element is provided with forward and rearward stops that restrict maximum forward and rearward axial movements of said second rotating element respectively, in which, said forward and rearward stops do not require use of set screws.

6. The mixing valve according to claim 1, 3 or 4, in which, said first and second marks are strategically located so that they provide clear visibility when they meet each other.

* * * * *